(No Model.)

H. C. HAVEN.
NURSING BOTTLE.

No. 351,596.  Patented Oct. 26, 1886.

WITNESSES
J. Henry Taylor.
James F. Bligh.

INVENTOR
Henry C. Haven
by Alex. P. Browne,
attorney.

UNITED STATES PATENT OFFICE.

HENRY C. HAVEN, OF BOSTON, MASSACHUSETTS.

NURSING-BOTTLE.

SPECIFICATION forming part of Letters Patent No. 351,596, dated October 26, 1886.

Application filed June 16, 1886. Serial No. 205,341. (No model.)

*To all whom it may concern:*

Be it known that I, HENRY C. HAVEN, of Boston, in the county of Suffolk and State of Massachusetts, a citizen of the United States, have invented certain new and useful Improvements in Nursing-Bottles, of which the following is a specification.

My invention relates to improvements in the construction of nursing-bottles for infants, and its object is to furnish an improved device for the purpose whereby the defects of existing devices may be obviated.

Among the principal defects in the forms of nursing-bottle now in use are, first, lack of capacity for being readily cleansed; second, the union or collocation of the air-inlet and milk-outlet, which necessitates ordinarily the use of an outlet so large that the milk in practice will run out by gravity from the nursing-bottle, and thus be delivered to the child too rapidly to be properly digested.

Figure 1:
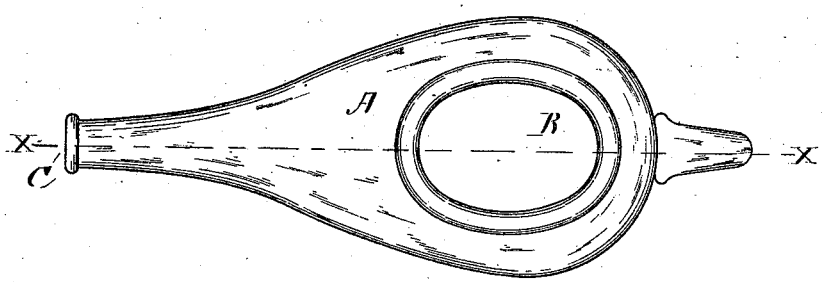
Figure 2:
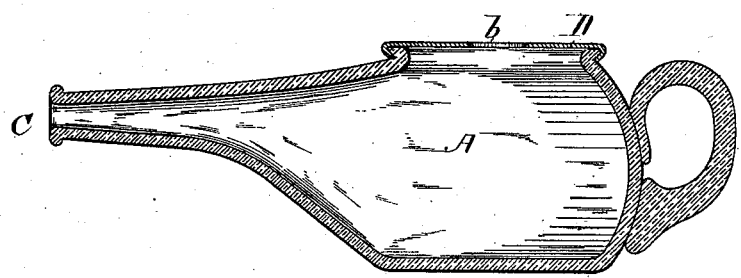
Figure 3:
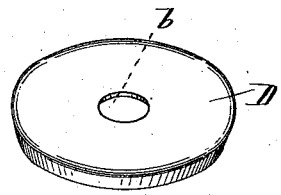

In the accompanying drawings I have shown in Figure 1 a view in plan of my improved nursing-bottle, and in Fig. 2 a view in vertical section on the line X X of Fig. 1. Fig. 3 shows in perspective the removable perforated rubber covering hereinafter mentioned.

My improved nursing-bottle is made of suitable material, preferably of annealed glass. It consists of a milk chamber or receptacle, A, provided with an unvalved air-inlet, B, and a milk-outlet, C, provided with a flange or enlargement to receive an elastic nipple.

I prefer to make the air-opening of sufficient size to serve also as an opening by which the bottle may be thoroughly cleaned. With a separate air-opening, as shown, as no part of the air-supply is required to be taken through the milk-outlet in the nipple, it is possible to make this in the form of a number of very minute openings too small to allow the fluid to run out by gravity, through which openings milk may be drawn by the child in a fine stream, thus more closely simulating nature than has heretofore been done. As it sometimes happens that the child to be fed has not sufficient strength to draw the milk from the bottle, I make provision for this contingency by providing the air-opening with a perforated flexible diaphragm, D. The perforation $b$ in this diaphragm still acts as an air-supply, and the attendant, by closing this perforation with the thumb or finger and pressing the diaphragm inwardly, may compress the air in the bottle, and thus force out the milk through the nipple. In this way the child may be fed by hand without any risk of feeding too fast. I believe the most desirable form of construction of this diaphragm to be as shown in the drawings at Fig. 3, which represents a perforated rubber cover adapted to be sprung on over a flaring lip or flange around the air-opening.

It will be noticed that my improved nursing-bottle is so constructed as to be always open except when in the hands of the nurse, as above stated, and consequently that its construction prevents its being left in the bed or crib with the child, which practice is objectionable from a sanitary point of view.

I hereby disclaim as of my invention any construction of nursing-bottle in which the feeding-outlet is formed of a tube passing through a compressible diaphragm, as illustrated in Letters Patent of the United States No. 220,351. According to my present invention the feeding-outlet of my bottle is entirely separate and distinct and located at a different part of the bottle from the air-inlet.

I claim—

The improved nursing-bottle herein described, having a flanged air-aperture provided with a compressible diaphragm having an air-inlet, and a separate feeding-outlet located at a different part of the bottle from the air-inlet, and formed to receive and hold an elastic nipple, substantially as described.

In testimony whereof I have hereunto subscribed my name this 12th day of June, A. D. 1886.

HENRY C. HAVEN.

Witnesses:
E. B. TOMLINSON,
J. HENRY TAYLOR.